US 12,468,807 B1

(12) United States Patent
Konigsberg et al.

(10) Patent No.: US 12,468,807 B1
(45) Date of Patent: Nov. 11, 2025

(54) TECHNIQUES FOR CONTROL PLANE LEVEL CONTAINMENT

(71) Applicant: Wiz, Inc., New York, NY (US)

(72) Inventors: Ron Konigsberg, Tel Aviv (IL); Matan Haim, Tel Aviv (IL); Itay Harel, Tel Aviv (IL); Itamar Gilad, Tel Aviv (IL); Arik Nemtsov, New York, NY (US)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/188,648

(22) Filed: Apr. 24, 2025

(51) Int. Cl.
*G06F 21/56* (2013.01)
*G06F 21/55* (2013.01)

(52) U.S. Cl.
CPC .......... *G06F 21/562* (2013.01); *G06F 21/554* (2013.01)

(58) Field of Classification Search
CPC .............................. G06F 21/562; G06F 21/554
See application file for complete search history.

(56) References Cited

U.S. PATENT DOCUMENTS

| | | | | |
|---|---|---|---|---|
| 10,032,026 | B1* | 7/2018 | Xu | G06F 21/566 |
| 10,205,733 | B1* | 2/2019 | Park | H04L 63/18 |
| 10,250,619 | B1* | 4/2019 | Park | H04L 63/18 |
| 10,574,683 | B1* | 2/2020 | Ghosh | H04L 63/1425 |
| 10,872,145 | B2 | 12/2020 | Brown et al. | |
| 10,893,059 | B1* | 1/2021 | Aziz | H04L 63/14 |
| 11,316,900 | B1* | 4/2022 | Schottland | H04L 63/1416 |
| 11,397,808 | B1* | 7/2022 | Prabhu | G06F 21/566 |
| 11,513,782 | B1* | 11/2022 | Landry | G06F 21/604 |
| 11,575,563 | B2 | 2/2023 | Woolward et al. | |
| 11,736,525 | B1* | 8/2023 | Rungta | H04L 41/0806 726/1 |
| 12,309,182 | B1* | 5/2025 | McAleer | G06F 9/455 |
| 2017/0300690 | A1* | 10/2017 | Ladnai | G06F 21/554 |
| 2017/0310692 | A1* | 10/2017 | Ackerman | H04L 63/1425 |
| 2019/0102551 | A1* | 4/2019 | Zimmermann | G06F 21/57 |
| 2019/0196939 | A1* | 6/2019 | Lengauer | G06F 11/3006 |
| 2019/0342150 | A1* | 11/2019 | Smith | H04L 63/08 |
| 2020/0244695 | A1* | 7/2020 | Veselov | H04L 63/1433 |
| 2022/0114262 | A1* | 4/2022 | Bhatia | G06F 21/554 |
| 2022/0247678 | A1 | 8/2022 | Atwal et al. | |
| 2023/0054226 | A1* | 2/2023 | Gross | H04L 67/564 |
| 2024/0220634 | A1* | 7/2024 | Benameur | G06F 9/44521 |
| 2024/0273179 | A1* | 8/2024 | Gupta | G06F 21/577 |
| 2024/0281530 | A1* | 8/2024 | Carru | G06F 21/57 |
| 2024/0291863 | A1* | 8/2024 | Cohen | G06F 21/53 |
| 2024/0422258 | A1* | 12/2024 | Gottfurcht | H04L 67/535 |

* cited by examiner

*Primary Examiner* — Darren B Schwartz
(74) *Attorney, Agent, or Firm* — M&B IP Analysts, LLC

(57) ABSTRACT

A method and system for control plane containment of cybersecurity threat is presented. The method includes generating at least a detection rule for application by a sensor configured to detect events; configuring the sensor to deploy on a resource in a cloud computing environment, and deploying the sensor on the resource, wherein the sensor is configured to: apply the at least a detection rule on a detected event; detect an event which triggers the at least a detection rule, the event corresponding to a process running on the resource; and halt execution of the process.

17 Claims, 5 Drawing Sheets

(12) United States Patent
US 12,468,807 B1

TECHNIQUES FOR CONTROL PLANE LEVEL CONTAINMENT

TECHNICAL FIELD

The present disclosure relates generally to the detection of cybersecurity threats, and specifically to a method for control plane containment of cybersecurity threats utilizing a software sensor.

BACKGROUND

Cybersecurity threats come in many shapes and forms, such as malware, worms, crypto miners, man-in-the-middle attacks, code injection, misconfigurations, and so on. Different threats pose different risks and can often be detected in different ways. As such, there are many solutions that detect different types of cybersecurity threats, each with advantages and disadvantages. Cloud computing platforms, such as those provided by Amazon® Web Services (AWS), Google® Cloud Platform (GCP), Microsoft® Azure, and the like, are high-value targets for attackers, and therefore their vulnerabilities are more likely to become cybersecurity threats. It is therefore extremely useful to detect such cybersecurity threats.

In the realm of cyber security threat detection, sensors play a pivotal role in monitoring and identifying malicious activities within networks and systems. However, the state of the art in sensor technology faces several challenges and issues. One significant concern is the ability of sensors to accurately detect and classify emerging threats in real-time. A cyber threats become increasingly sophisticated and diverse, traditional sensors may struggle to keep pace with rapidly evolving cyberattacks. Additionally, the sheer volume of data generated by modern networks poses a challenge for sensors, as they must sift through vast amounts of information to identify potential threats while avoiding false positives.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include generating at least a detection rule for application by a sensor configured to detect events. The method may also include configuring the sensor to deploy on a resource in a cloud computing environment. The method may furthermore include deploying the sensor on the resource, where the sensor configured to: apply that at least a detection rule on a detected event; detect an event which triggers the at least a detection rule, the event corresponding to a process running on the resource; and halt execution of the process. Other embodiments of this aspect include corresponding computer systems, apparatus, and computer programs recorded on one or more computer storage devices, each configured to perform the actions of the methods.

Implementations may include one or more of the following features. The method may include: generating the at least a detection rule based on static analysis of a code object utilized in deploying the resource. The method may include: generating the at least a detection rule based on a determined state of the resource. The method may include: configuring the sensor to detect runtime data, where runtime data includes any one of: a state of a resource, a cloud entity, a component, an application, and any combination thereof. The method may include: applying the at least a detection rule to an event based on comparing data of the detected event with a predefined condition of the at least a detection rule. The method may include: configuring the sensor to deploy on any one of: a virtual machine, a software container, a serverless function, and any combination thereof. The method may include: configuring the sensor to perform any one of: real-time tracing of system calls, monitor resource usage, and any combination thereof. The method may include: configuring the sensor to perform a mitigation action in response to detecting a potential threat based on an event which triggers the at least a detection rule. The method where a mitigation action includes any one of: halting an execution of a process running on a resource, isolating a system, modifying a permission, disabling a compromised account, blocking an unauthorized user, and any combination thereof. Implementations of the described techniques may include hardware, a method or process, or a computer tangible medium.

In one general aspect, a non-transitory computer-readable medium may include one or more instructions that, when executed by one or more processors of a device, cause the device to: generate at least a detection rule for application by a sensor configured to detect events; configure the sensor to deploy on a resource in a cloud computing environment. A non-transitory computer-readable medium may also include and deploy the sensor on the resource, where the sensor configured to: apply that at least a detection rule on a detected event detect an event which triggers the at least a detection rule, the event correspond to a process running on the resource; and halt execution of the process. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: generate at least a detection rule for application by a sensor configured to detect events. The system may in addition configure the sensor to deploy on a resource in a cloud computing environment. The system may moreover and deploy the sensor on the resource, where the sensor configured to: apply that at least a detection rule on a detected event. The system may furthermore detect an event that triggers the at least a detection rule, the event correspond to a process running on the resource. The system may in addition halt execution of the process. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: generate the at least a detection rule based on static analysis of a code object utilized in deploying the resource. The system where the memory contains further instructions which when executed by the processing circuitry further configure the system to: generate the at least a detection rule based on a determined state of the resource. The system where the memory contains further instructions which when executed by the processing circuitry further configure the system to: configure the sensor to detect runtime data, where runtime data includes any one of: a state of a resource, a cloud entity, a component, an application, and any combination thereof. The system where the memory contains further instructions which when executed by the processing circuitry further configure the system to: apply the at least a detection rule to an event based on comparing data of the detected event with a predefined condition of the at least a detection rule. The system where the memory contains further instructions which when executed by the processing circuitry further configure the system to: configure the sensor to deploy on any one of: a virtual machine, a software container, a serverless function, and any combination thereof. The system where the memory contains further instructions which when executed by the processing circuitry further configure the system to: configure the sensor to perform any one of: real-time trace of system calls, monitor resource usage, and any combination thereof. The system where the memory contains further instructions which when executed by the processing circuitry further configure the system to: configure the sensor to perform a mitigation action in response to detecting a potential threat based on an event which triggers the at least a detection rule. The system where a mitigation action includes any one of: halting an execution of a process running on a resource, isolating a system, modifying a permission, disabling a compromised account, blocking an unauthorized user, and any combination thereof. Implementations of the described techniques may include hardware, a method or process, or a computer-tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
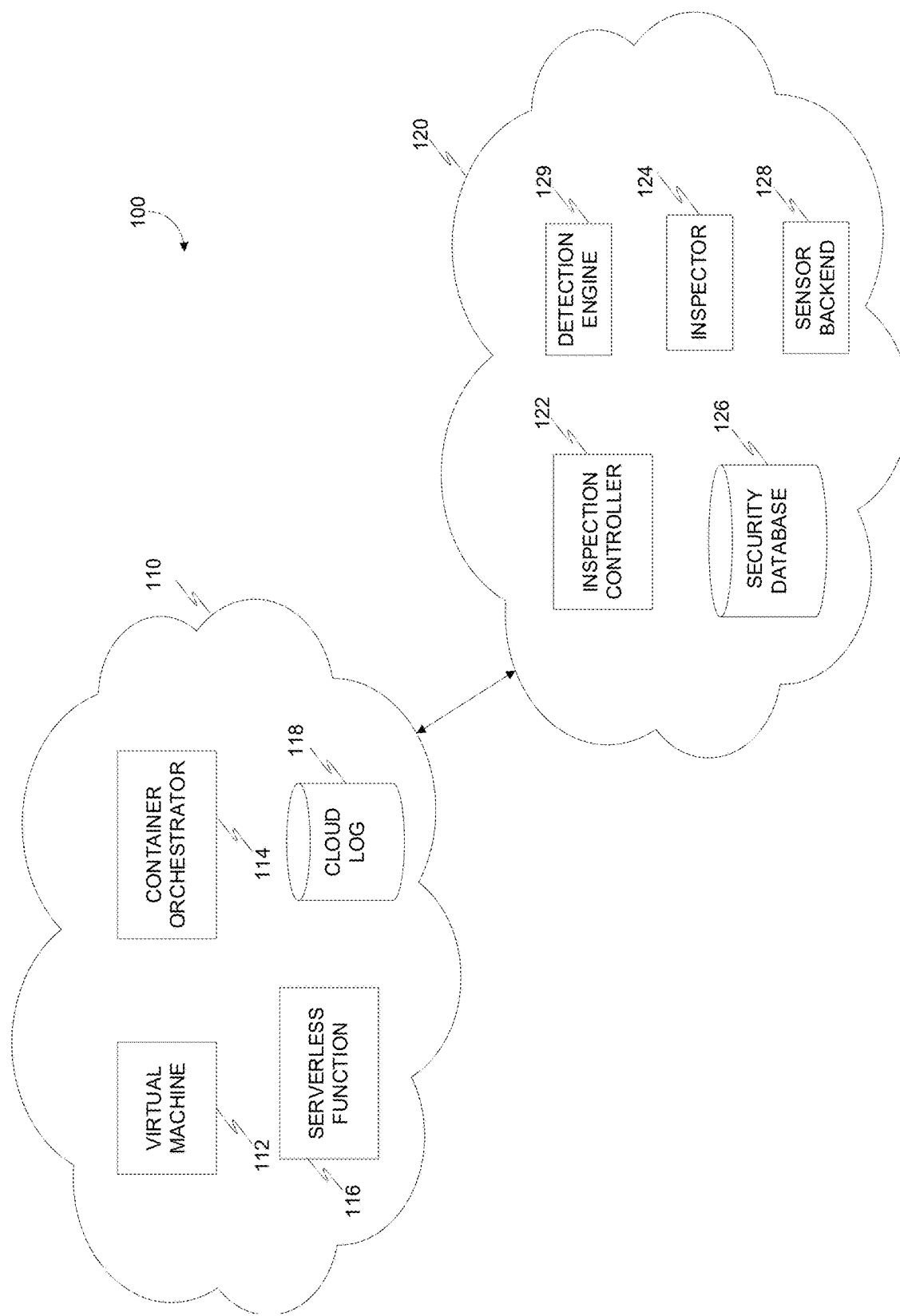
FIG. 1 is an example schematic diagram of a cloud computing environment monitored for a cybersecurity threat by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method for control plane containment of cybersecurity threats, based on the utilization of a sensor that is configured with detection rules that allow for an accurate detection of potential cybersecurity threats, vulnerabilities, and the like.

FIG. 1 is an example schematic diagram 100 of a cloud computing environment monitored for a cybersecurity threat by an inspection environment, implemented in accordance with an embodiment. In an embodiment, a cloud computing environment 110 includes a virtual private cloud (VPC), Virtual Network (VNet), and the like, deployed on a cloud computing platform. A cloud computing platform may be provided, for example, by Amazon® Web Services (AWS), Google® Cloud Platform (GCP), Microsoft® Azure, and the like.

A cloud computing environment 110 includes cloud entities deployed therein. A cloud entity may be, for example, a principal, a resource, a combination thereof, and the like. In an embodiment, a resource is a cloud entity which provides access to a compute resource, such as a processor, a memory, a storage, and the like. In some embodiments, a resource is a virtual machine, a software container, a serverless function, and the like. A resource may be, or may include, a software application deployed thereon, such as a webserver, a gateway, a load balancer, a web application firewall (WAF), an appliance, and the like.

In certain embodiments, a principal is a cloud entity which is authorized to initiate actions in the cloud computing environment. A principal may be, for example, a user account, a service account, a role, and the like. In some embodiments, a cloud entity is a principal relative to another cloud entity, and a resource to other cloud entities. For example, a load balancer is a resource to a user account requesting a webpage from a webserver behind the load balancer, and the load balancer is a principal to the webserver.

The cloud computing environment 110 includes a plurality of resources, such as a virtual machine 112, a software container orchestrator 114, a serverless function 116, and a cloud log 118. A virtual machine 112 may be deployed, for example, utilizing Oracle® VirtualBox®. A software container orchestrator 114 may be deployed, for example, utilizing a Docker® engine, a Kubernetes® engine, and the like. In an embodiment, a software container orchestrator 114 is configured to deploy a software cluster, each cluster including a plurality of nodes. In an embodiment, a node includes a plurality of pods. A serverless function 116 may be, for example, utilized with Amazon® Lambda. In an embodiment, the serverless function 116 is a serverless function container image.

In an embodiment, the cloud log 118 is configured to store events in a cloud computing environment 110. In some embodiments, the cloud log is configured to store runtime events from a runtime sensor. According to an embodiment, an event is data record of an occurrence or action in a network. In an embodiment, the event indicates unauthorized access to, disruption, misuse, a combination thereof and the like, of a computer network, a computer resource, an identity, and the like.

For example, in an embodiment, an event is an unsuccessful user login attempt, deletion of a file, unusual network communication, system modifications, notifications of security alerts, a combination thereof, and the like. In certain embodiments, the cloud log 118 is implemented as a database which is deployed to run in a public or hybrid cloud environment and is managed by database-as-a-service (DBaaS), deployed on a cloud-based virtual machine (VM), and the like.

Each such resource is susceptible to various cybersecurity threats. Such threats can become apparent, for example, due to a software version of an application in a software container orchestrator 114, an operating system (OS) version of a virtual machine 112, a misconfiguration in code of a serverless function 116, and the like. The cloud computing environment 110 is monitored for cybersecurity threats by an inspection environment 120, in an embodiment. In an embodiment, the inspection environment 120 is implemented utilizing a cloud computing environment, such as a VPC, VNet, and the like.

In an embodiment, each of the virtual machine 112, the software container orchestrator 114, and the serverless function 116 include a sensor configured to a particular resource, resource type, combination thereof, and the like. An example deployment of a sensor is discussed in more detail in FIG. 2 below.

In an embodiment, the sensor (not shown in FIG. 1) is configured to listen for events, packets, and the like, on a data link layer. For example, the sensor is configured to utilize an eBPF interface, which allows the non-intrusive monitoring of the data link layer communication.

In some embodiments, the sensor is implemented as a runtime sensor that is configured to be deployed alongside operating systems, open source platform container clusters, and the like. In certain embodiments, the runtime sensor is configured to monitor system behavior in real time to detect a cybersecurity threat. In an embodiment, the runtime sensor is configured to track the log system and entity behaviors in real time. For example, in an embodiment a runtime sensor is configured to monitor network activity and track any one of: user actions, file changes, system configurations, memory usage, a combination thereof, and the like.

In certain embodiments, the sensor is further configured to send data to and receive data from a sensor backend server 128. The sensor backend server 128 is a workload, such as a virtual machine, software container, serverless function, combination thereof, and the like, which is deployed in the inspection environment 120.

In an embodiment, the sensor backend server 128 is configured to receive sensor data which is generated from the sensor (e.g., runtime sensor). For example, the sensor backend server 128 is configured, in an embodiment, to receive events from a sensor. In some embodiments, the sensor is configured to request from the sensor backend server 128, rules, definitions, and the like, which the sensor is configured to apply to events, for example, as detected on an eBPF interface. For example, in an embodiment, a predetermined event, such as indicating access to an IP address, IP address range, and the like, is checked against a definition. A definition is a logical expression which, when applied to an event, yields a "true" or "false" result, in an embodiment. In an embodiment, a rule is a logical expression which includes an action. For example, in an embodiment, a rule is that in response to a certain definition being true when applied to an event, data pertaining to the event should be sent to the sensor backend server 128.

In some embodiments, the sensor backend server 128 is configured to initiate inspection of a resource deployed in the cloud computing environment 110. For example, in an embodiment, the sensor backend server 128 is configured to initiate such inspection in response to receiving an event, data, a combination thereof, and the like, from a sensor deployed on a resource. In an embodiment, initiating inspection of a resource is performed by generating an instruction for an inspection controller 122, the instruction, when executed, configures an inspector 124 to inspect the resource.

For example, in an embodiment, a sensor is configured to send log data to the sensor backend server 128 in response to detecting that a definition, applied by the sensor to a detected event, results in a "true" value when applied. As an example, in an embodiment, the definition may be "is the IP address in the range of 127.0.0.1 through 127.0.0.99", which in this example corresponds to an IP address range used by a malware, such as a crypto miner. In an embodiment, when the definition is applied, for example, to a detected network packet, and the result is "true", the sensor is configured to send data pertaining to the event of the sensor backend server 128. In various embodiments, data pertaining to the event is, for example, an IP address, an event type, combinations thereof, and the like.

In an embodiment, the sensor backend server 128 is configured to receive the data. In some embodiments, the sensor backend server 128 is further configured to apply a rule to the received data to determine if an inspection of the workload on which the sensor is deployed should be inspected for a cybersecurity threat. For example, in an embodiment, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

In certain embodiments, the inspection environment 120 further includes a security database 126, on which a representation of the computing environment 110 is stored. In an embodiment, the security database is configured to store a representation of a cloud computing environment, such as cloud computing environment 110. For example, in an embodiment, the representation is based on a predefined unified data schema, so that each different cloud platform is represented using a unified data schema, allowing for a unified representation. For example, in an embodiment, a principal is represented by a predefined data structure, each principal represented by a node in the security graph. Likewise, a resource may be represented by another predefined data structure, each resource represented by a node in the security graph, in an embodiment.

In certain embodiments, sensor data that is received from a sensor deployed on a resource in the cloud computing environment is stored in the security database 126.

In various embodiments, the inspection environment 120 further includes a detection engine 129. In an embodiment, the detection engine 129 is configured to detect cybersecurity threats and attacks based on detected events stored in the cloud log 118 and the state of entities (e.g., cloud entities) deployed in the cloud computing environment 110, a combination thereof, and the like. Further, in an embodiment, the detection engine 129 is configured to access data from the cloud log 118. Moreover, the detection engine 129 is configured to receive sensor data from a runtime sensor, in some embodiments. In various embodiments, the detection engine 129 is configured to determine a state for each entity in the cloud computing environment 110, for example, based on data extracted from events received from a sensor deployed on a resource in the computing environment 110.

In some embodiments, the detection engine 129 is configured to detect an anomaly based on the detection of an event and state of entities deployed in the cloud computing environment, a combination thereof, and the like. In most embodiments, the detection engine 129 is configured to initiate a remediation action based on the detected anomaly.

Figure 2:
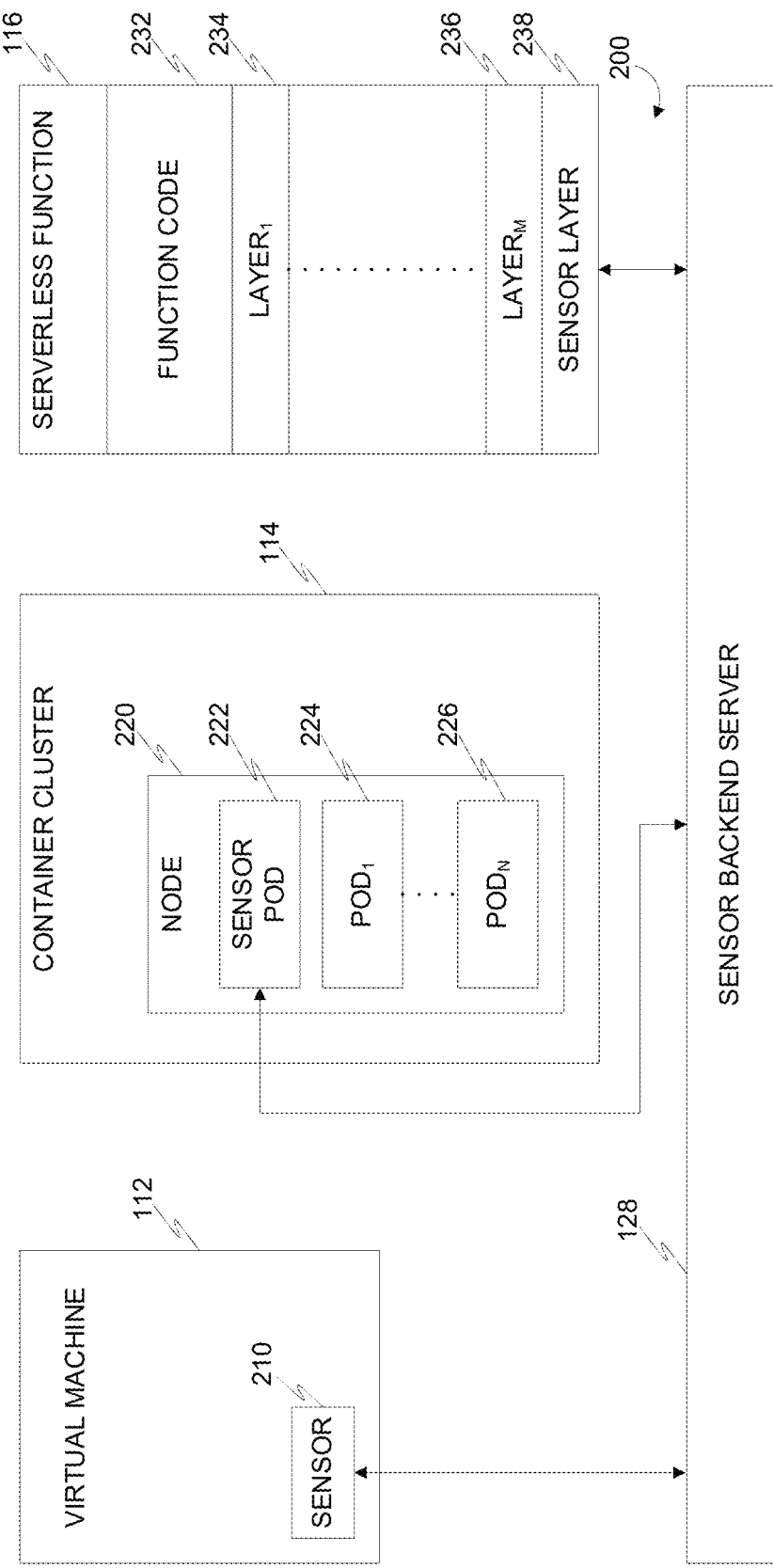
FIG. 2 is an example schematic illustration of a sensor backend server communicating with a plurality of sensors deployed on various workloads, implemented in accordance with an embodiment.

FIG. 2 is an example schematic illustration 200 of a sensor backend server communicating with a plurality of sensors deployed on various workloads, implemented in accordance with an embodiment. In some embodiments, a sensor backend server 128 is configured to communicate with a machine (not shown) having a sensor installed thereon and communicatively coupled with the sensor backend server 128. In an embodiment, the machine is a bare metal machine, a computer device, a networked computer device, a laptop, a tablet, and the like computing devices.

In an embodiment, a sensor backend server 128 is implemented as a virtual machine, a software container, a serverless function, a combination thereof, and the like. In certain embodiments, a plurality of sensor backend servers 128 may be implemented. In some embodiments, where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc.

In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

According to an embodiment, a virtual machine 112 includes a sensor 210. In an embodiment, the sensor 210 is deployed as a service executed on the virtual machine 112. In some embodiments, a virtual machine 112 is configured to request binary code, a software package, and the like, for example, from a sensor backend server 128, which when executed by the virtual machine 112, cause a sensor 210 to run as a service on the virtual machine 112. The sensor 210 is configured to listen to a data link layer communication, for example, through an eBPF interface.

A software container orchestrator 114 runs a daemonset, and includes a plurality of nodes, such as node 220. The daemonset ensures that each node 220 runs a daemonset pod 222, which is configured as a sensor. For example, a Kubernetes® cluster may execute a daemonset configured to deploy a daemonset pod on each deployed node, wherein the daemonset pod is configured to listen to a data link layer communication, for example, through an eBPF interface, to communication of a plurality of pods, such as pod-1 224 through pod-N 226, where 'N' is an integer having a value of '1' or greater. The daemonset pod 222 is configured, in an embodiment, to communicate with the sensor backend server 128.

A serverless function 116 includes, in an embodiment, a function code 232, and a plurality of code layers 1 through M (labeled respectively as 234 through 236), where 'M' is an integer having a value of '1' or greater. For example, in AWS Lambda a layer contains, in an embodiment, code, content, a combination thereof, and the like. In some embodiments, a layer, such as layer 234, includes runtime data, configuration data, software libraries, and the like.

In certain embodiments, the serverless function 116 includes a sensor layer 238. The sensor layer 238 is configured, in an embodiment, to listen to a data link layer communication of the serverless function 116, for example, through an eBPF interface.

The sensor 210, daemonset pod 222, and sensor layer 238 are each an implementation of a sensor, according to an embodiment. In an embodiment, a sensor is configured to communicate with a sensor backend server 128 through a transport layer protocol, such as Transmission Control Protocol (TCP). For example, the sensor backend server 128 is configured, in an embodiment, to listen to a predetermined port using a TCP protocol, and a sensor, such as sensor 210, daemonset pod 222, and sensor layer 238 are each configured to communicate with the sensor backend server 128, for example, by initiating communication using TCP over the predetermined port.

Figure 3:
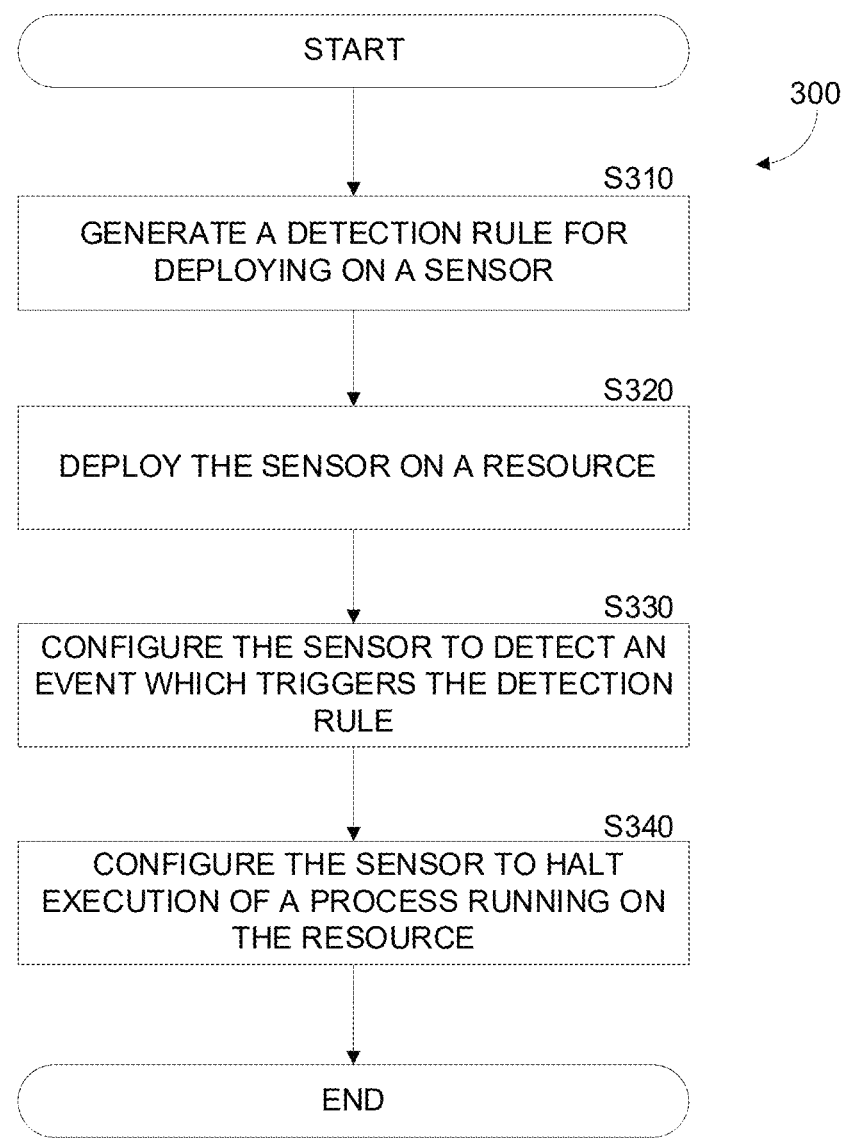
FIG. 3 is an example flowchart of a method for control plane containment of cybersecurity threats, implemented in accordance with an embodiment.

FIG. 3 is an example flowchart 300 of a method for control plane containment of cybersecurity threats, implemented in accordance with an embodiment. It is advantageous to utilize a sensor which is configured with detection rules for the detection of cybersecurity threats, and the ability to perform a mitigation action in response to such threats. In an embodiment, this provides for an accurate detection of actual threats instead of potential false threats, and provides a rapid action in response of such threats.

At S310, a detection rule is generated for deploying on a sensor. In an embodiment, the sensor is implemented as a runtime sensor. In some embodiments, the sensor is configured to be deployed on a resource in the cloud computing environment. In certain embodiments, a resource is a virtual machine, a software container, a serverless function, and the like. In an embodiment, a resource is a software application, file, gateway, webserver, load balancer, a web application firewall (WAF), and the like.

In an embodiment, a detection engine is configured to generate a detection rule, policy, conditional rule, and the like. In an embodiment, a detection rule is a logical expression, for example, a conditional rule that receives an input and outputs a true or false response as an output.

In some embodiments, the detection rule is generated based on static analysis of a code object utilized in deploying the resource. In certain embodiments, static analysis is performed on code objects (e.g., computer executable code) of files, software applications and the like, utilized to deploy resources in the computing environment. In various embodiments, static analysis includes examining code objects without fully executing the code, in order to generate a detection rule, policy, conditional rule, and the like.

For example, in an embodiment, in response to a code object indicating an application deployed on a system is configured to receive an input (e.g., a data packet) from a specific range of Internet Protocol (IP) addresses (e.g., 192.24.0.100 to 192.24.0.900), a detection rule to "only accept a data packet from IP addresses within the range of 192.24.0.100 through 192.24.0.900", is implemented by the sensor. In various embodiments, static analysis is conducted on code objects to identify potential cybersecurity threats, security vulnerabilities, and the like, of the computing system.

In an embodiment, the detection engine is configured to generate a detection rule based on the determined state of a resource. In various embodiments, a detection engine receives runtime data that is generated from a sensor (e.g., runtime sensor). In an embodiment, runtime data is utilized to determine the state of resources, cloud entities, components, applications, and the like, which are deployed in the cloud computing environment.

For example, in an embodiment, a detection rule is generated based on a normal baseline state of a resource, entity, cloud entity, and the like. For example, in an embodiment, if it is the normal behavior of a specific user to utilize two failed login attempts to access a server, a detection rule is generated to trigger an alert in response to four failed login attempts of that specific user within a one-hour time period. In an embodiment, for example, if the baseline behavior of a specific user account is to have low level privileges, a detection rule is generated to trigger an alert in response to the specific user account privilege being escalated.

At S320, the sensor is deployed on a resource. In some embodiments, the sensor (e.g., runtime sensor) is configured to deploy on virtual machines, software containers, serverless functions, a combination thereof, and the like. In certain embodiments, the sensor is configured to monitor network traffic in real time. In an embodiment, the sensor In an embodiment, the sensor is configured to detect events originating from processes running on a resource, host, software container, physical machine, hardware device, and the like. In an embodiment, the sensor is configured to detect events, runtime events, cloud events, and the like, in the cloud computing environment. In certain embodiments, the sensor is configured to perform real-time tracing of system calls, monitor resource usage (e.g., processor, memory, storage, network bandwidth, etc.), a combination thereof, and the like.

In some embodiments, an event is a specific occurrence within an operating system, occurring relative to a software application deployed on a virtualization, an event related to a cloud computing environment, an event related to a software container, a combination thereof, and the like. In some embodiments, an event record is a digital record of an event.

In certain embodiments, the event is a specific occurrence within the network traffic. In an embodiment, the event is a data record indicating a change in the state of a system, network, environment, operating system a combination thereof, and the like. In some embodiments, an event record includes an event identifier, a principal associated with the event, an identifier of a resource the event occurred on, a timestamp of when the event occurred, a combination thereof, and the like.

At S330, the sensor is configured to detect an event which triggers a detection rule. In various embodiments, the sensor, the detection engine, and a combination thereof, are configured to apply at least a detection rule to a detected event, runtime event, event record, cloud event, and the like. In various embodiments, detection rules are applied to events based on comparing the data of the detected event, event record, cloud event, runtime event, and the like, with a predefined condition of the detection rule.

For example, in an embodiment, a detection rule such as "generate an alert in response to a user attempting to access a file more than three times in a day" is triggered by the event of an unknown user attempting to access a software file three times within an hour. In an embodiment, for example, a detection rule such as "generate an alert in response to an unprivileged user attempting to access a resource outside of their role", is triggered by the event of a user account attempting to access a confidential file (e.g., a file tagged as including sensitive data) five times in an hour.

At S340, the sensor is configured to halt execution of a process running on a resource. In various embodiments, the sensor is configured to halt the execution of a process (e.g., execution of a software application) running on a resource in response to the process triggering a detection rule (e.g., an event indicating the process triggers a detection rule). In some embodiments, the sensor is configured to initiate mitigation actions, automated actions, and the like, in response to detecting events indicating potential threats, vulnerabilities, and the like, indicated from an event that triggers a detection rule.

In various embodiments, a mitigation action includes halting execution of a process running on a resource, isolating a process, modifying a permission of an application, modifying a permission of a user account, disabling a compromised account, blocking an unauthorized user, blocking network traffic, resetting a network connection, a combination thereof, and the like.

For example, in an embodiment, the sensor is configured to halt an unknown software application from running on a resource, in response to an event triggering the detection rule of performing a mitigation action in response to an unknown software application being installed from an unauthorized user. In an embodiment, the sensor is configured, for example, to halt the execution of an unidentified file upload onto a virtual machine, in response to the event triggering the detection rule of performing a mitigation action in response to a file upload from an unprivileged user acting outside of their role.

Figure 4:
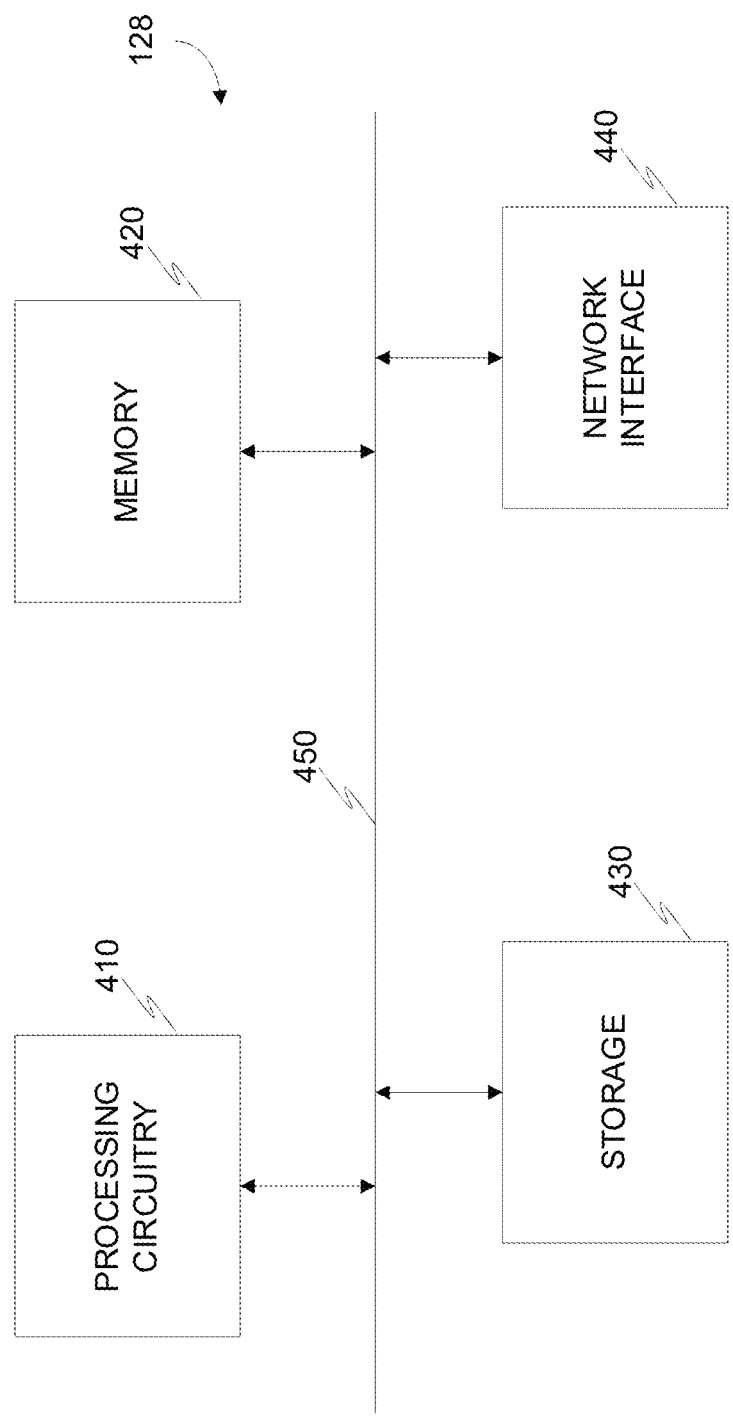
FIG. 4 is a schematic diagram of a sensor backend server according to an embodiment.

FIG. 4 is an example schematic diagram of a sensor backend server 128 according to an embodiment. In an embodiment, the sensor backend server 128 of FIG. 1 is implemented as the sensor backend server 128. The sensor backend server 128 includes a processing circuitry 410 coupled to a memory 420, a storage 430, and a network interface 440. In an embodiment, the components of the sensor backend server 128 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the sensor backend server 128 to communicate with, for example, a sensor 210, a daemonset pod 222, a sensor layer 238, and the like.

It should be understood that the embodiments described herein are not limited to the specific architecture illustrated in FIG. 4, and other architectures may be equally used without departing from the scope of the disclosed embodiments.

Furthermore, in certain embodiments the inspection controller 122, inspector 124, and the like, may be implemented with the architecture illustrated in FIG. 4. In other embodiments, other architectures may be equally used without departing from the scope of the disclosed embodiments.

Figure 5:
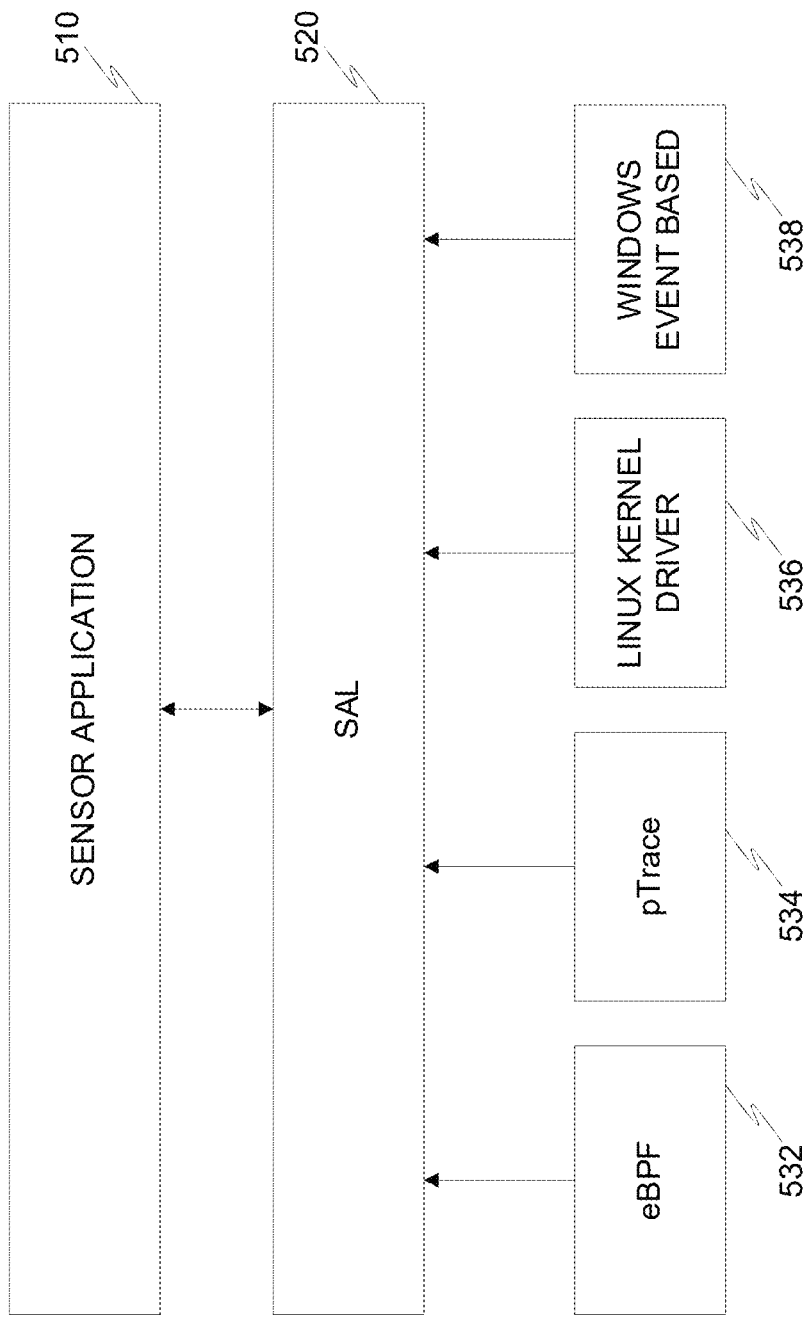
FIG. 5 is a schematic illustration of a multi-architecture sensor deployment, implemented in accordance with an embodiment.

FIG. 5 is an example schematic illustration of a multi-architecture sensor deployment, implemented in accordance with an embodiment. In an embodiment, a sensor application 510 is deployed from a software abstraction layer (SAL) 520. In some embodiments, the SAL 520 includes a monitoring debugger on which the sensor application 510 is deployed. In certain embodiments, the SAL 520, monitoring debugger, etc., is a persistent software, which is continuously executed while the machine is operational, while the sensor application 510 is semi-persistent.

According to an embodiment, a semi-persistent software application is operational other than periods during which the semi-persistent software is updated, rebooted, changed, etc. In some embodiments, a sensor having a split architecture between a persistent portion (i.e., the SAL 520) and a semi-persistent portion (i.e., the sensor application 510) is advantageous as it allows a persistent engine on one hand, while retaining the capability to update itself without loss of event monitoring.

For example, in an embodiment, the SAL 520 is configured to receive, detect, listen to, and the like, events from multiple different computing architectures. This allows to deploy and update the same sensor application 510 across multiple different type of computes, virtualizations, and the like, without having to then code a specific interface for each such virtualization.

For example, in an embodiment, the SAL 520 is configured to receive events through an eBPF interface 532, a pTrace interface 534, a Linux® Kernel driver 536, and a Microsoft® Windows® event based interface 538. Thus, the same sensor application 510 can detect events regardless of what type of compute originated the event. When the sensor application 510 requires updating, such can be done without having to also update the SAL 520 component. Therefore, a single update of the sensor application 510 can be applied to each computing instance, such as a virtual machine, a software container, a serverless function, and the like, without having to address each uniquely.

According to an embodiment, a split-architecture for a sensor is advantageous for utilization in a run-time environment of a serverless function, a software container, and like. For example, in an embodiment, such an environment is implemented utilizing AWS Elastic Compute Service (ECS) Fargate, AWS Elast Kubernetes Service (EKS) Fargate, Azure Container Apps (ACA), and the like. In such embodiments, access to eBPF, for example, is either limited or not available, as the software container is controlled by a client, while the machine is controlled by a provider, such as a cloud computing infrastructure provider.

In an embodiment, a sensor application is deployed in a client container, and an entry point override is added to run the sensor application. In some embodiment, the sensor application is added into a container image during build.

In some embodiments, the sensor is deployed on a shared volume. The shared volume is then mounted into a software container. The entry point of the software container is then overridden to the sensor application. This deployment allows the sensor application to be updated periodically, according to an embodiment.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for control plane containment of cybersecurity threats, comprising:
    generating at least a detection rule for application by a sensor configured to detect events;
    configuring the sensor to deploy on a resource in a cloud computing environment;
    generating the at least a detection rule based on static analysis of a code object utilized in deploying the resource;
    deploying the sensor on the resource, wherein the sensor is configured to:
      apply the at least a detection rule on a detected event;
      detect an event which triggers the at least a detection rule, the event corresponding to a process running on the resource; and
      halt execution of the process.

2. The method of claim 1, further comprising:
    generating the at least a detection rule based on a determined state of the resource.

3. The method of claim 1, further comprising:
    configuring the sensor to detect runtime data, wherein runtime data includes any one of: a state of a resource, a cloud entity, a component, an application, and any combination thereof.

4. The method of claim 1, further comprising:
    applying the at least a detection rule to an event based on comparing data of the detected event with a predefined condition of the at least a detection rule.

5. The method of claim 1, further comprising:
    configuring the sensor to deploy on any one of: a virtual machine, a software container, a serverless function, and any combination thereof.

6. The method of claim 1, further comprising:
    configuring the sensor to perform any one of: real-time tracing of system calls, monitor resource usage, and any combination thereof.

7. The method of claim 6, further comprising:
    configuring the sensor to perform a mitigation action in response to detecting a potential threat based on an event which triggers the at least a detection rule.

8. The method of claim 7, wherein a mitigation action includes any one of: halting an execution of a process running on a resource, isolating a system, modifying a permission, disabling a compromised account, blocking an unauthorized user, and any combination thereof.

9. A non-transitory computer-readable medium storing a set of instructions for control plane containment of cybersecurity threats, the set of instructions comprising:
    one or more instructions that, when executed by one or more processors of a device, cause the device to:
      generate at least a detection rule for application by a sensor configured to detect events;
      configure the sensor to deploy on a resource in a cloud computing environment;
      generate the at least a detection rule based on static analysis of a code object utilized in deploying the resource;
      deploy the sensor on the resource, wherein the sensor is configured to:
      apply the at least a detection rule on a detected event
      detect an event which triggers the at least a detection rule, the event correspond to a process running on the resource; and
      halt execution of the process.

10. A system for control plane containment of cybersecurity threats comprising:
    a processing circuitry;
    a memory, the memory containing instructions that, when executed by the processing circuitry, configure the system to:
    generate at least a detection rule for application by a sensor configured to detect events;
    configure the sensor to deploy on a resource in a cloud computing environment;
      generate the at least a detection rule based on static analysis of a code object utilized in deploying the resource;
    deploy the sensor on the resource, wherein the sensor is configured to:
      apply the at least a detection rule on a detected event
      detect an event which triggers the at least a detection rule, the event correspond to a process running on the resource; and
      halt execution of the process.

11. The system of claim 10, wherein the memory contains further instructions which when executed by the processing circuitry further configure the system to:
    generate the at least a detection rule based on a determined state of the resource.

12. The system of claim 10, wherein the memory contains further instructions which when executed by the processing circuitry further configure the system to:
    configure the sensor to detect runtime data, wherein runtime data includes any one of: a state of a resource, a cloud entity, a component, an application, and any combination thereof.

13. The system of claim 10, wherein the memory contains further instructions which when executed by the processing circuitry further configure the system to:
    apply the at least a detection rule to an event based on comparing data of the detected event with a predefined condition of the at least a detection rule.

14. The system of claim 10, wherein the memory contains further instructions which when executed by the processing circuitry further configure the system to:
    configure the sensor to deploy on any one of: a virtual machine, a software container, a serverless function, and any combination thereof.

15. The system of claim 10, wherein the memory contains further instructions which when executed by the processing circuitry further configure the system to:
    configure the sensor to perform any one of: real-time trace of system calls, monitor resource usage, and any combination thereof.

16. The system of claim 15, wherein the memory contains further instructions which when executed by the processing circuitry further configure the system to:

configure the sensor to perform a mitigation action in response to detecting a potential threat based on an event which triggers the at least a detection rule.

17. The system of claim 16, wherein a mitigation action includes any one of:
halting an execution of a process running on a resource, isolating a system, modifying a permission, disabling a compromised account, blocking an unauthorized user, and any combination thereof.

* * * * *